US010270890B2

(12) United States Patent
Vyas et al.

(10) Patent No.: US 10,270,890 B2
(45) Date of Patent: Apr. 23, 2019

(54) TRANSMITTING IP PACKETS ORIGINATING IN A WIRELESS STATION WHEN THE IP PACKETS ARE DESTINED FOR DELIVERY TO MULTIPLE DESTINATIONS VIA AN ACCESS POINT

(71) Applicant: GainSpan Corporation, San Jose, CA (US)

(72) Inventors: Pankaj Vyas, Bangalore (IN); Vishal Batra, Bangalore (IN)

(73) Assignee: GAINSPAN CORPORATION, San Jose, CA (US)

( * ) Notice: Subject to any disclaimer, the term of this patent is extended or adjusted under 35 U.S.C. 154(b) by 193 days.

(21) Appl. No.: 14/797,197

(22) Filed: Jul. 13, 2015

(65) Prior Publication Data

US 2017/0019829 A1    Jan. 19, 2017

(51) Int. Cl.
| | |
|---|---|
| H04W 4/70 | (2018.01) |
| H04L 12/46 | (2006.01) |
| H04L 29/06 | (2006.01) |
| H04L 29/08 | (2006.01) |
| H04W 80/04 | (2009.01) |
| H04L 12/805 | (2013.01) |

(52) U.S. Cl.
CPC .......... *H04L 69/18* (2013.01); *H04L 12/4633* (2013.01); *H04L 69/324* (2013.01); *H04L 69/325* (2013.01); *H04W 4/70* (2018.02); *H04L 47/36* (2013.01); *H04L 2012/4629* (2013.01); *H04W 80/04* (2013.01)

(58) Field of Classification Search
CPC ..... H04L 69/18; H04L 69/324; H04L 69/325; H04W 4/005
See application file for complete search history.

(56) References Cited

U.S. PATENT DOCUMENTS

| | | | |
|---|---|---|---|
| 6,678,474 B1 * | 1/2004 | Masuda | H04J 14/0212 398/68 |
| 7,120,852 B2 | 10/2006 | Terry | |
| 7,489,688 B2 | 2/2009 | Giesberts | |
| 8,204,005 B2 | 6/2012 | Liu | |

(Continued)

OTHER PUBLICATIONS

Youngsoo Kim, Sunghyun Choi, Kyunghun Jang, Hyosun Hwang, Throughput enhancement of IEEE 802.11 WLAN via frame aggregation, Vehicular Technology Conference, 2004. VTC2004-Fall. 2004 IEEE 60th (vol. 4 ) , Date of Conference: Sep. 26-29, 2004, pp. 3030-3034 vol. 4 , ISSN :1090-3038, IEEE.

(Continued)

*Primary Examiner* — Xavier Wong
(74) *Attorney, Agent, or Firm* — Pearl Cohen Zedek Latzer Baratz LLP (57) ABSTRACT

A wireless station of a wireless network generates a single layer-2 frame containing multiple layer-3 packets in its payload. Each of the multiple layer-3 packets is destined to a corresponding different destination. The wireless station transmits the layer-2 frame to an access point (AP) of the wireless network. The AP receives the layer-2 frame, disassembles the payload into individual layer-3 packets, and transmits each of the individual layer-3 packets separately towards the corresponding destinations. In an embodiment, the wireless network is according to IEEE 802.11 standards, each layer-3 packet is an IP packet, and the layer-2 frame is a MAC frame.

13 Claims, 6 Drawing Sheets

(56) References Cited

U.S. PATENT DOCUMENTS

| | | | |
|---|---|---|---|
| 8,249,105 B2 | 8/2012 | Joshi | |
| 8,509,193 B2 | 8/2013 | Hassan | |
| 8,559,306 B2 | 10/2013 | Gong | |
| 8,654,748 B2 | 2/2014 | Trainin | |
| 8,761,069 B2 | 6/2014 | Banerjea | |
| 9,420,518 B2* | 8/2016 | Purohit | H04W 40/244 |
| 2005/0152358 A1* | 7/2005 | Giesberts | H04L 29/06 |
| | | | 370/389 |
| 2006/0139201 A1* | 6/2006 | Nagata | H04W 28/06 |
| | | | 342/1 |
| 2007/0177495 A1* | 8/2007 | Ametsitsi | H04L 69/32 |
| | | | 370/208 |
| 2009/0063804 A1* | 3/2009 | Trainin | H04L 1/1621 |
| | | | 711/170 |
| 2011/0222408 A1* | 9/2011 | Kasslin | H04L 41/083 |
| | | | 370/241 |
| 2014/0140209 A1* | 5/2014 | Shihada | H04L 43/0864 |
| | | | 370/230 |
| 2014/0254408 A1 | 9/2014 | Shukla | |
| 2015/0124704 A1* | 5/2015 | Asterjadhi | H04L 69/04 |
| | | | 370/328 |
| 2016/0277064 A1* | 9/2016 | Waxman | H04B 1/713 |

OTHER PUBLICATIONS

Adnan Majeed and Nael B. Abu-Ghazaleh, Packet Aggregation in Multi-rate Wireless LANs, Sensor, Mesh and Ad Hoc Communications and Networks (SECON), 2012 9th Annual IEEE Communications Society Conference on, Date of Conference: Jun. 18-21, 2012, pp. 452-460, ISSN :2155-5486, IEEE.

Pietro Nicoletti, IEEE 802.11 frame format, date Jun. 2005, pp. 1-23.

\* cited by examiner

TRANSMITTING IP PACKETS ORIGINATING IN A WIRELESS STATION WHEN THE IP PACKETS ARE DESTINED FOR DELIVERY TO MULTIPLE DESTINATIONS VIA AN ACCESS POINT

BACKGROUND

Technical Field

Embodiments of the present disclosure relate generally to wireless networks, and more specifically to delivering of IP (Internet Protocol) packets originating in a wireless station when the IP packets are destined for delivery to multiple destinations via an access point.

Related Art

A wireless network may be viewed as having wireless stations communicatively coupled on wireless path to each other via an access point (AP). The wireless stations are either the source machines or (target) destination machines for the data packets (from the viewpoint of the wireless network), with the AP operating as a switching device which receives each data packet from a source station and forwarding the packet to the destination station. Wireless networks are implemented using standards such as IEEE 802.11, as is well known in the relevant arts.

Wireless stations often encode data packets in the form of Internet Protocol (IP) packets. An IP packet is characterized by a destination IP address, which specifies the destination machine. IP is commonly used when the data may need to be communicated to systems outside of the wireless network. In a known configuration, an AP is coupled with a wired path to a router-type device, which extends the connectivity of the wireless stations to devices on the Internet, in a known way.

A wireless station may need to transmit multiple IP packets, with each packet destined to a different destination. For example, a wireless station may take multiple measurements corresponding to different parameters, and the measured value for each parameter may need to be sent to a different target. Assuming such different parameters are temperature, pressure, water level, etc., temperature measurements may be sent to one target, pressure measurements may be sent to another target, and water level measurements may be sent to another target.

It is generally desirable that access points send such multiple IP packets efficiently, as suited in the corresponding environments.

BRIEF DESCRIPTION OF THE VIEWS OF DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A wireless station of a wireless network generates a single layer-2 frame containing multiple layer-3 packets in its payload. Each of the multiple layer-3 packets is destined to a corresponding different destination. The wireless station transmits the layer-2 frame to an access point (AP) of the wireless network. The AP receives the layer-2 frame, disassembles the payload into individual layer-3 packets, and transmits each of the individual layer-3 packets separately towards the corresponding destinations. In an embodiment, the wireless network is according to IEEE 802.11 standards, each layer-3 packet is an IP packet, and the layer-2 frame is a MAC frame.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
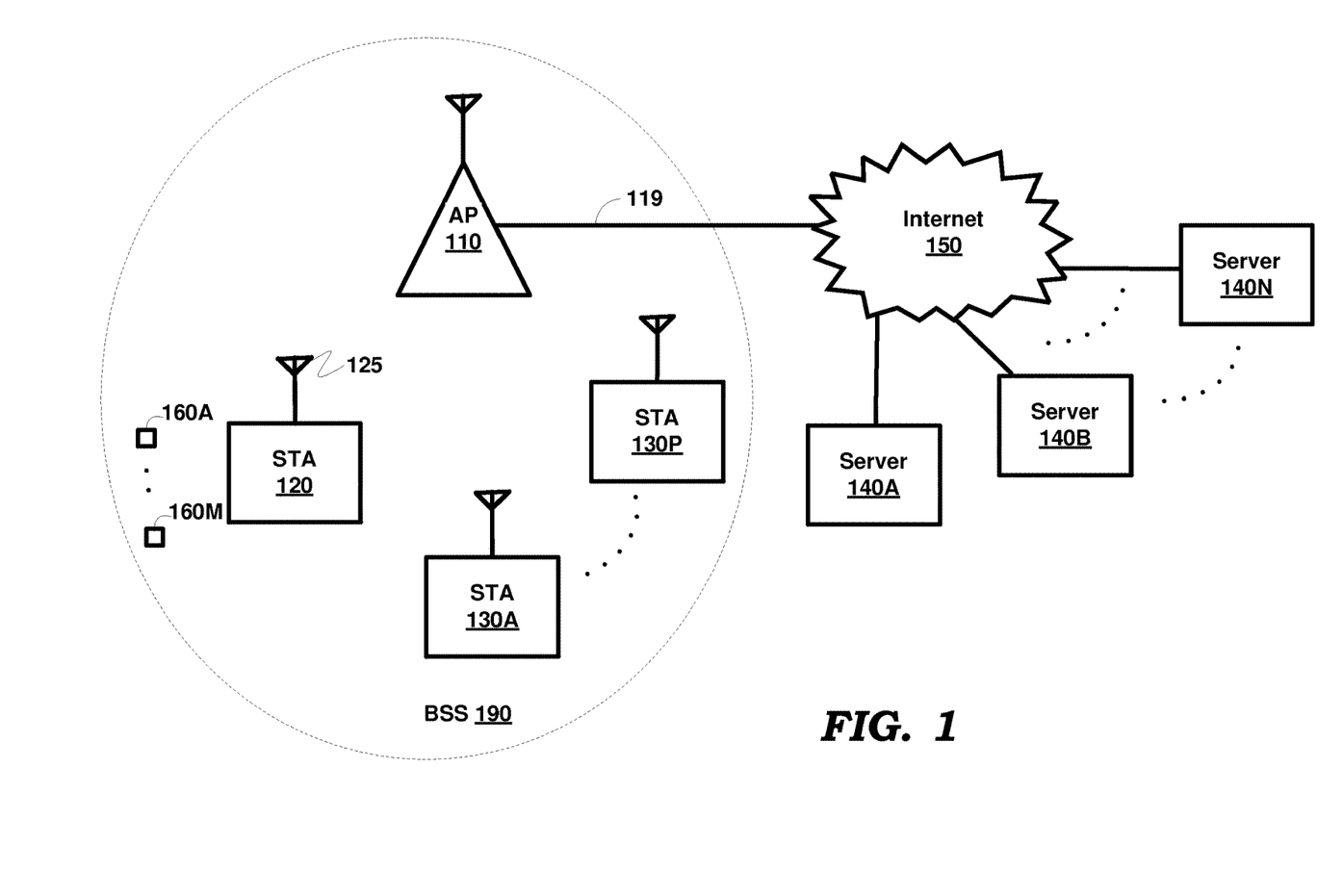
FIG. 1 is a block diagram of an example environment in which several aspects of the present disclosure may be implemented.

FIG. 1 is a block diagram representing an example environment in which several aspects of the present disclosure can be implemented. The example environment is shown containing only representative devices and systems for illustration. However, real-world environments may contain more or fewer systems/devices. FIG. 1 is shown containing access point (AP) 110, wireless stations (STA) 120, STAs 130A-130P, servers 140A-140N, internet 150, and sensors 160A-160M. The wireless network (WLAN) containing AP 110, STA 120 and STAs 130A-130P may be referred to as an infrastructure basic service set (BSS) 190.

Servers 140A-140N represent computing devices that provide desired user applications. In an embodiment, each of servers 140A-140N is designed to process a corresponding set of measurements (e.g., temperature, pressure, etc.) received from STA 120 based on respective user applications. Each of servers 140A-140N is connected to internet 150, and can communicate using IP (Internet Protocol) with other devices/systems in internet 150, as well as with STA 120 and STAs 130A-130P. The servers may process IP packets received from other devices in a desired manner and present the results of the processing to a user/administrator.

Internet 150 extends the connectivity of devices (STA 120 and STAs 130A-130P) in BSS 190 to various devices/systems (e.g., servers 140A-140N) connected to, or part of, internet 150. Internet 150 is shown connected to AP 110 (which may be viewed as operating as a border router as well) through a wired path 119. Internet 150 may be implemented using protocols such as IP (Internet Protocol). In general, in IP environments, an IP packet is used as a basic unit of transport, with the source address being set to the IP address assigned to the source system from which the packet originates and the destination address set to the IP address of the destination system to which the packet is to be eventually delivered. The IP packet is encapsulated in the payload of layer-2 packets when being transported across WLANs.

An IP packet is said to be directed to a destination system when the destination IP address of the packet is set to the IP address of the destination system, such that the packet is eventually delivered to the destination system. When the packet contains content such as port numbers, which specifies the destination application, the packet may be said to be directed to such application as well. The destination system may be required to keep the corresponding port numbers available/open, and process the packets with the corresponding destination ports.

Each of STAs 120 and STAs 130A-130P represents an end device that is a source or destination of data elements, when viewed from the perspective of the wireless network of FIG. 1. The data elements are transmitted to (and received from) AP 110 in layer-2 (medium access control (MAC)) frames in accordance with 802.11 family of standards. While the data elements are described as being destined only to servers 140A-140N in the description below, such servers can be placed in conjunction with some of the STAs in BSS 190 in alternative embodiments.

The STAs 130A-130P may communicate with each other via AP 110 using IP, with IP addressing being used for communications with servers 140A-140N as well. Thus, each of STA 120 and STAs 130A-130P is assigned a unique IP address using DHCP type protocols well known in the relevant arts. AP 110, in addition to performing operations consistent with the corresponding wireless standard, operates as an IP router to forward packets received from the other devices of FIG. 1 to the appropriate destination or next-hop device.

In an embodiment, AP 110, STA 120 and STAs 130A-130P form a basic service set (BSS) 190 consistent with IEEE 802.11 family of standards (including amendments such as 802.11a, 802.11b, 802.11i, 802.11n, etc.). However, in other embodiments, AP 110, STA 120 and STAs 130A-130P may be designed to operate according to other wireless standards, such as for example, IEEE 802.15.4. The antenna of STA 120 is shown numbered as 125. Antennas of other wireless devices of FIG. 1 are indicated by the corresponding symbol, but not numbered.

Each of sensors 160A-160M generates measurements (data values) representing a parameter of interest, such as for example, temperature, pressure, etc., of/in corresponding objects. Each of sensors 160A-160M forwards the respective data values to STA 120 on a wired or wireless path (not shown). STA 120 is designed to forward the data values to one or more of desired destinations STA 130A-130P and/or servers 140A-140N in the form of IP packets.

According to a prior technique, STA 120 may use a separate MAC frame for transmitting data values as IP packets to different servers 140A to 140N. In other words, a single MAC frame would contain only a single IP packet (containing data values) destined to only a single server in such an approach. Assuming the temperature reading is to be transmitted to server 140A, STA 120 forms an IP packet containing the temperature measurement in its payload, and the destination IP address of server 140A in the destination IP address field of the IP packet (with the other fields of the IP packet containing corresponding entries). STA 120 then encapsulates the IP packet thus formed in a layer-2 frame, and transmits the layer-2 frame to AP 110.

AP 110 extracts the IP packet from the layer-2 frame, and forwards the IP packet to a next-hop device in the route to server 140A. For another data value to another server, STA 120 would similarly form another layer-2 frame with encapsulated IP packet, and transmit the layer-2 frame to AP 110, which then forwards the encapsulated IP packet along the path to the corresponding destination.

The prior approach may have a drawback in that STA 120 would have to contend for the wireless transmission medium prior to transmitting each IP packet, and the prior approach may therefore be inefficient in terms of power consumption and/or time required for overall data transfer.

Aspects of the present disclosure overcome the drawback noted above, as described next with respect to a flowchart.

3. IP Packet Aggregation

Figure 2A:
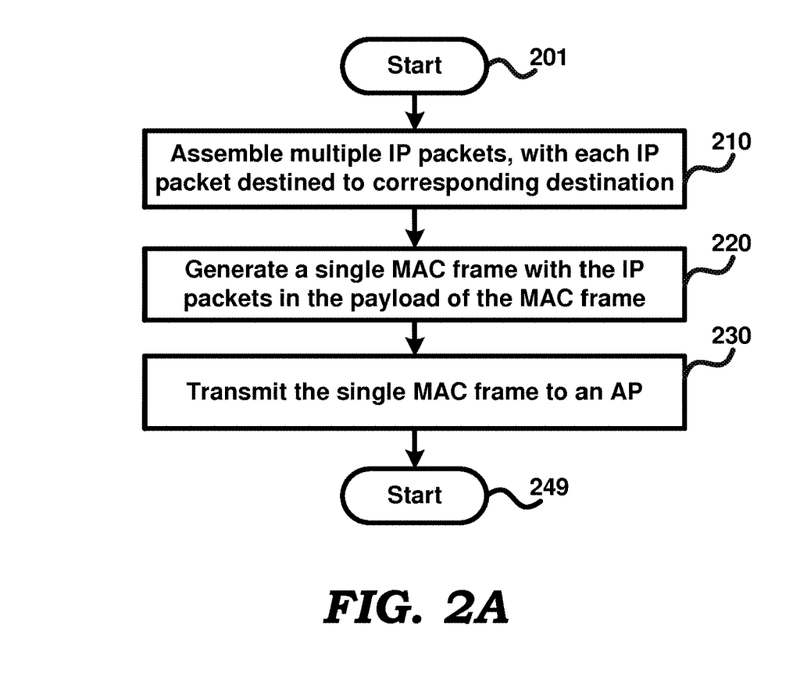
FIG. 2A is a flow chart illustrating the manner in which a wireless station (STA) of a wireless network transmits IP packets, in an embodiment of the present disclosure.

FIG. 2A is a flow chart illustrating the manner in which a STA of a wireless network transmits multiple IP packets efficiently, in an embodiment of the present disclosure. Merely for illustration, the flowchart is described below as being performed in STA 120. However, the features can be implemented in other STAs also, as well as in other environments, without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, STA 120 assembles multiple IP packets, with each IP packet destined to a corresponding IP destination. The payloads of each of the IP packets may contain one or more measurement values (data values) received from one or more of sensors 160A-160M. It should be appreciated that the IP packets themselves can be formed within STA 120 or received from corresponding sensors (in which case each IP packet contains measured values only from that sensor). Irrespective of where each IP packet is formed, the IP packets are assumed to be available for further processing, as described below. Control then passes to step 220.

In step 220, STA 120 generates a single layer-2 (i.e., MAC) frame with the assembled IP packets in the payload of the MAC frame. In other words, a single MAC frame contains multiple IP packets, with each IP packet being destined to potentially different destination (server 140A-140N). Control then passes to step 230.

In step 230, STA 120 transmits the single MAC frame to AP 110. Control then passes to step 249, in which the flowchart ends.

Although in the flowchart of FIG. 2A, multiple IP packets are described as being placed in the payload of a single MAC packet, the technique can be extended in general to place multiple layer-3 packets in the payload of a layer-2 packet, which is then transmitted on a wireless medium. As is well known in the relevant arts, a layer-2 packet is a packet that is destined to a next-hop device (with respect to the transmitter of the layer-2 packet) within a network, while a layer-3 packet is a packet that is designed to be routed to a destination device one or more networks away from the transmitter in the network.

Figure 2B:
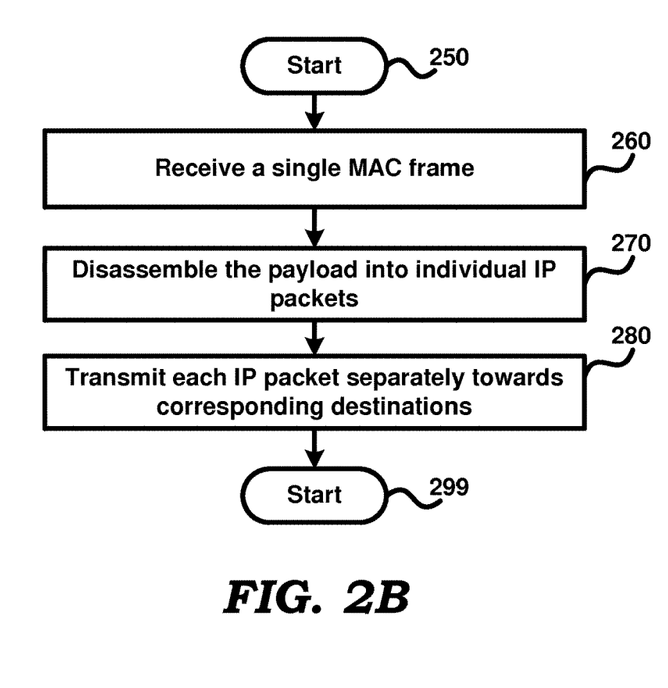
FIG. 2B is a flow chart illustrating the manner in which an access point (AP) of a wireless network processes a layer-2 frame containing multiple IP packets, in an embodiment of the present disclosure.

FIG. 2B is a flow chart illustrating the manner in which an AP of a wireless network processes a MAC frame containing multiple IP packets, in an embodiment of the present disclosure. Merely for illustration, the flowchart is described below as being performed in AP 110. However, the features can be implemented in other environments, without departing from the scope and spirit of various aspects of the present invention, as will be apparent to one skilled in the relevant arts by reading the disclosure provided herein. In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 250, in which control immediately passes to step 260.

In step 260, AP 110 receives a single MAC frame containing multiple IP packets in the payload of the MAC frame. As an example, the MAC frame could be the MAC frame transmitted by STA 120 in step 230 of the flowchart of FIG. 2A. Control then passes to step 270.

In step 270, AP 110 disassembles the payload of the received MAC frame into individual IP packets. In an embodiment, each individual IP packet requires no modifications to any headers, etc., and therefore AP 110 can retransmit IP packets without requiring modifications to IP headers. AP may merely need to encapsulate each IP packet with any header as suitable for transmission on wired path 119. Control then passes to step 280.

In step 280, AP 110 transmits each IP packet separately to the corresponding destination. The destination addresses are contained in the destination IP address fields of the IP packets. Control then passes to step 299, in which the flowchart ends.

Again, although the flowchart of FIG. 2B describes disassembly of the payload of a MAC frame to obtain multiple IP packets which is are then individually (sequentially) forwarded to the corresponding destinations, the technique can be extended in general to disassembly of the payload of a layer-2 packet to obtain multiple layer-3 packets, which are then individually transmitted to the corresponding destinations.

It may be appreciated that since multiple layer-3 packets are assembled into the payload portion of a single layer-2 frame, STA 120 needs to contend for the wireless medium only once, rather than for each layer-3 packet as in the prior approach noted above. As a result, the transmission of layer-3 packets at least in BSS 190 is rendered efficient.

The operations of the steps of the flowcharts of FIGS. 2A and 2B are illustrated next with examples.

4. Examples

Figure 3:
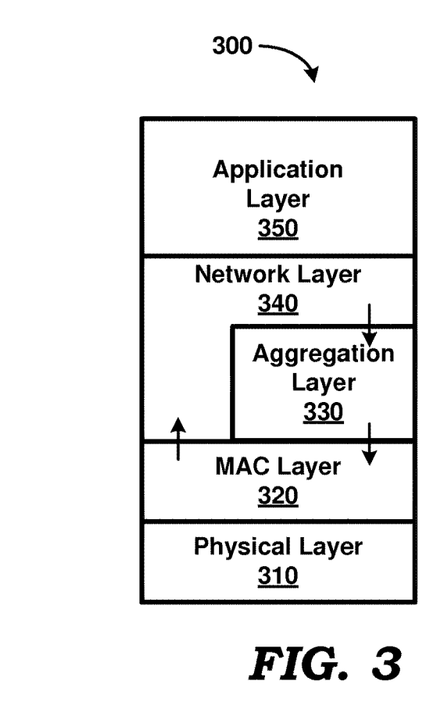
FIG. 3 is a block diagram showing the details of a communication protocol stack in a STA of a wireless network, in an embodiment of the present disclosure.

FIG. 3 is a diagram illustrating the various layers of a communication protocol stack in STA 120. Communication protocol stack 300 is shown containing physical layer 310, data-link layer (or MAC) layer 320, aggregation layer 330, network layer 340 and application layer 350.

Application layer 350 represents a communications component that allows software applications executing in STA 120 to communicate with software applications in other nodes, such as for example, servers 140A-140N. Application layer executes user applications, and receives data values generated by one or more of sensors 160A-160M. Application layer 350 may process the data values suitably, and forwards each received data value to network layer 340, along with the destination IP address to which the data value is to be to be transmitted. Application layer 350 may forward each packet as the packet is received (or with a slight delay). In an embodiment, each type of data value is destined for a specific destination. As an example, all temperature measurements may be destined for server 140A, pressure measurements may be destined to server 140B, etc.

Network layer 340 receives a data value, and forms an IP packet, with the data value placed in the payload portion of the IP packet. Network layer 340 stores the destination address to which the data value is to be sent in the destination IP address field of the header of the IP packet. Other fields of the header (e.g., total length of the IP packet) may suitably be programmed by network layer 340. As specified in RFC 731, bits 16-31 of an IP packet are used to specify the total length of the IP packet, and network layer 340 places the corresponding length of the IP packet in this field, to enable AP 110 to identify IP packet boundaries and correctly disassemble an aggregated payload, as described below.

Network layer 340 similarly forms other IP packets, each containing a corresponding data value as its payload and a corresponding destination IP address in the destination IP address field of its header. While the IP packets are described as being formed within STA 120, it should be appreciated that IP packets may be received from the sensors generating the data values as well. Irrespective, network layer 340 assembles (gathers) multiple IP packets. Network layer 340 may also store multiple data values in the payload of a same IP packet if all such multiple data values are destined to a same destination. Network layer 340 forwards each IP packet thus formed to aggregation layer 330. It is assumed that each IP packet is encoded as a UDP packet, and accordingly the transport layer is not shown between layers 340 and 350. However, alternative embodiments may employ TCP for reliable delivery of each packet.

Aggregation layer 330 receives IP packets from network layer 340, and concatenates multiple of such received IP packets to form a single (aggregated) payload. Aggregation layer 330 forwards the aggregated payload to MAC layer 320. In an embodiment, the size of the aggregated payload is limited to the maximum allowed size, i.e., maximum transmission unit (MTU) specified by the IEEE 802.11 family of standards. It should be appreciated that MTU size may be easily obtained since packets destined to multiple destinations are being aggregated, and accordingly the wireless medium is efficiently used.

In addition, or in an alternative embodiment, aggregation layer 330 aggregates only as many IP packets into a single payload as can be done before the expiry of an MTU timer. The timer may be started upon the availability of the first IP packet to be incorporated into the frame, and if the maximum MTU size (noted above) is not reached before the expiry of the MTU timer, the MAC frame is transmitted with as many packets as are then available/assembled (at the expiration of the timer).

Figure 4:
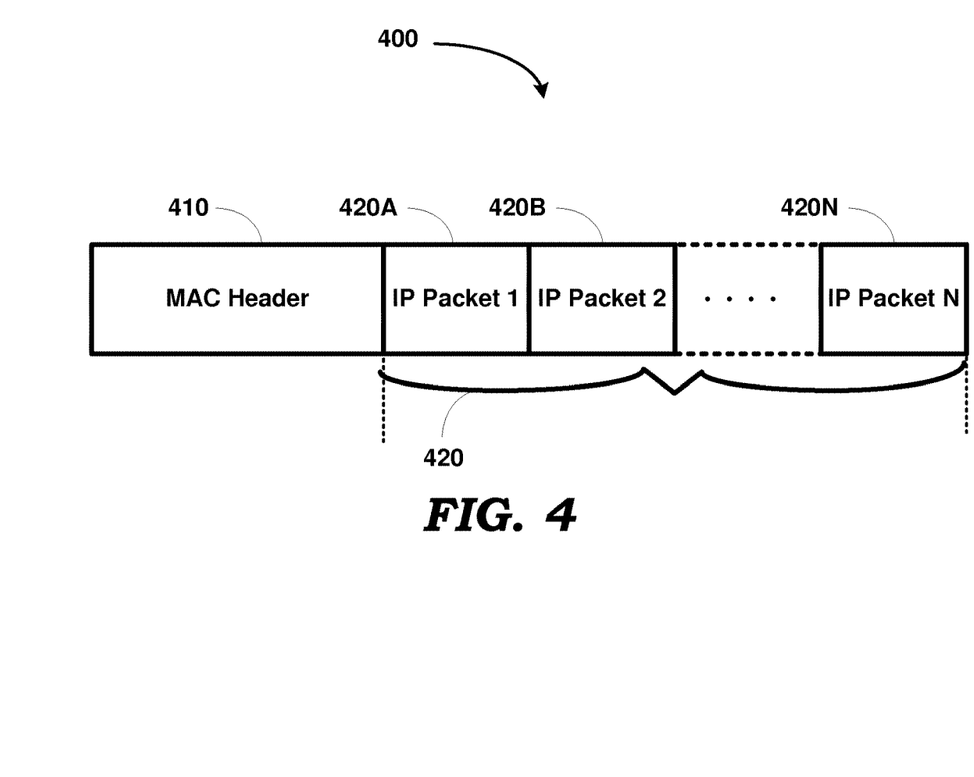
FIG. 4 is a diagram illustrating the contents of a layer-2 frame transmitted by a STA of a wireless network, in an embodiment of the present disclosure.

MAC layer 320 receives an aggregated payload from aggregation layer 330, and forms a single MAC frame with the aggregated payload placed in the payload of the single MAC frame. MAC layer 320 places the MAC address of AP 110 in the destination address field of the MAC frame. An example of a MAC frame formed by MAC layer 320 is shown in FIG. 4. Field 410 of MAC frame 400 is the MAC frame header, and field 420 is the payload portion of MAC frame 400. IP packets 420A, 420B through 420N represent the multiple IP packets placed in the payload portion 420. In an embodiment, each of packets 420A, 420B through 420N is destined to a different destination. For example, packets 420A, 420B through 420N may respectively be destined to servers 140A, 140B through 140N. As another example, packets 420A through 420N may be destined respectively for STAs 130A through 130P (P assumed to equal N in this example).

Figure 5:
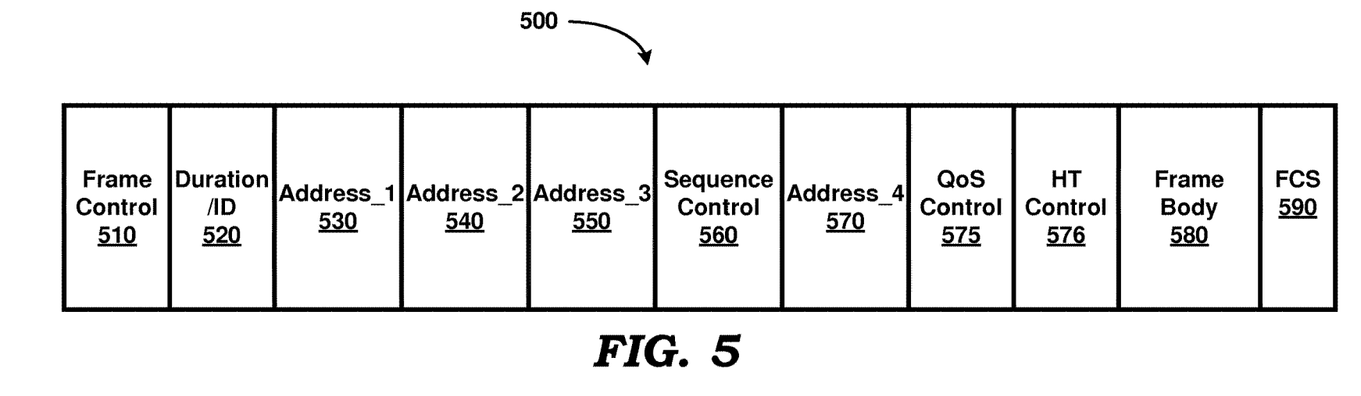
FIG. 5 is a diagram illustrating the contents of a layer-2 frame transmitted by a STA of a wireless network according to IEEE 802.11 standards, in an embodiment of the present disclosure.

When frame 400 corresponds to an IEEE 802.11 (WLAN) frame, frame 400 has the detailed structure shown in FIG. 5A. Frame 500 of FIG. 5A is shown containing fields Frame Control 510, Duration/ID 520, Address_1 530, Address_2 540, Address_3 550, Sequence Control 560, Address_4 570, QoS Control 575, HT control 576, Frame Body 580 and FCS 590.

Frame Body 580 corresponds to payload 420 of FIG. 4. The rest of the fields together represent MAC header 410 of FIG. 4. A detailed description of the fields of packet 500 is provided in Section 8 of the IEEE Std 802.11-2012 document available with the International Telecommunications Union (ITU). Only those fields as relevant to this disclosure are described herein. It is also noted that, in practice, frame 500 may contain more or fewer fields or proprietary modifications depending on the specific deployment environment.

MAC layer 320 places the BSSID of BSS 190, MAC address of STA 120 and the MAC address of AP 110 respectively in address fields 530, 540 and 550. Address field 570 is a "don't care". Frame control field 510 is shown in greater detail in FIG. 6, which shows sub-fields Protocol Version 610, Type 620, Sub-type 630, To DS 640, From DS 650, More Frag 660, Retry 670, Power Management 675, More Data 676, WEP 680 and Reserved (Rsvd) 690. A detailed description of the fields of packet 500 is provided in Section 8.2.4 of the IEEE Std 802.11-2012 document available with the International Telecommunications Union (ITU). Only those fields as relevant to this disclosure are described herein. MAC layer 320 programs fields 'To DS' 640 and 'From DS' 650 to 1 and 0 respectively.

Figure 6:
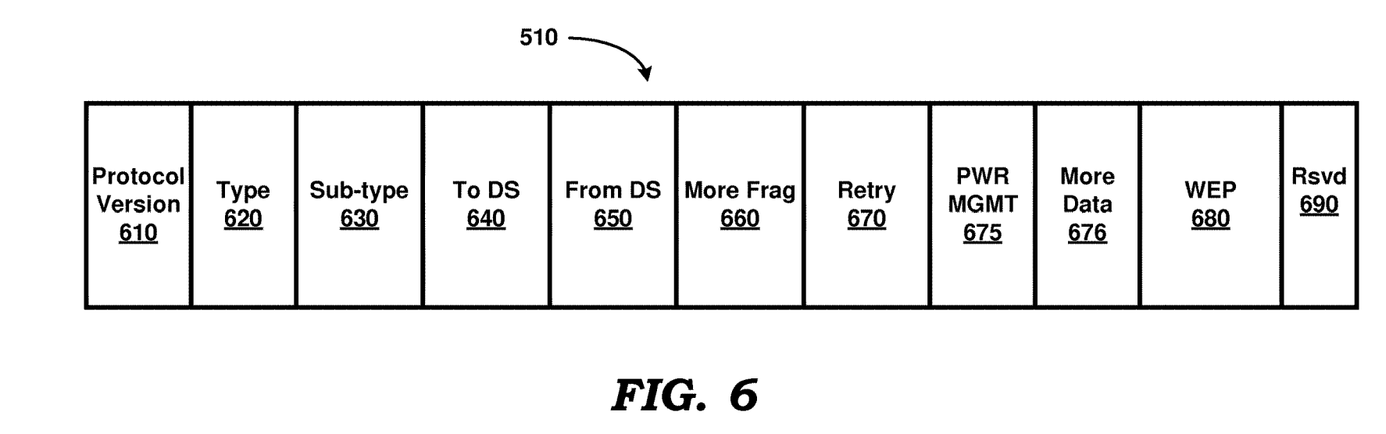
FIG. 6 is a diagram illustrating the sub-fields of a 'frame control field' of an IEEE 802.11 MAC frame transmitted by a STA, in an embodiment of the present disclosure.

In an embodiment, MAC layer 320 programs the 'type' field 620 and 'sub-type' field 630 to indicate that frame 500/400 contains multiple IP packets in its payload, to enable AP 110 to disassemble packet 500/400 correctly. The specific values of the 'type' and 'sub-type' fields can be any that are not currently specified for use by the IEEE 802.11 standard. As an example, the value of the 'type' field can be 10 (binary), and the value of the 'sub-type' field can be 1101 (binary). In an alternative embodiment, MAC layer 320 programs fields 620 and 630 with a 'regular' value (for example 'type' field as 10 (binary), and 'subtype' field as any value that has data/QoS data combination, for example 0000 (binary)), and indication that frame 500/400 contains multiple IP packets is provided in an information element (IE) field of an association request packet sent by STA 120 to AP 110 prior to joining BSS 190.

MAC layer 320 also performs medium access operation (e.g., CSMA/CA) specified by the corresponding wireless standard, and forwards frame 500/400 to physical layer 310. Physical layer 310 transmits frame 500/400 on the wireless medium via antenna 125.

Figure 7:
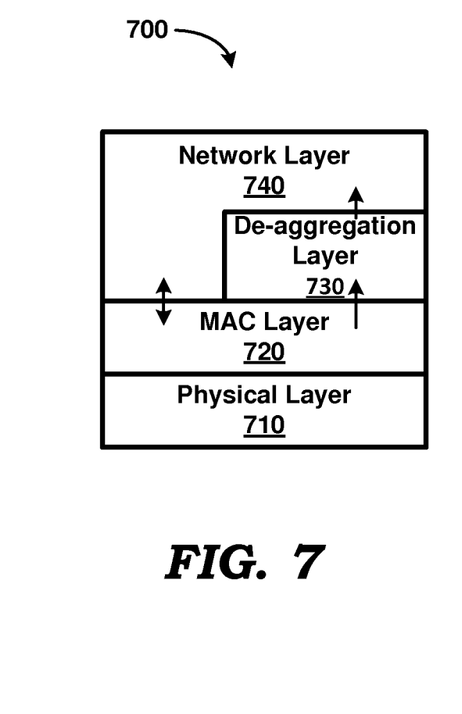
FIG. 7 is a block diagram showing the details of a communication protocol stack in an AP of a wireless network, in an embodiment of the present disclosure.

The respective layers of the communication protocol stack 700 implemented in AP 110 are shown in FIG. 7. Communication protocol stack 700 is shown containing physical layer 710, data-link layer (or MAC) layer 720, de-aggregation layer 730, and network layer 740. The operations at the respective layers of stack 700 upon receiving frame 500/400 are noted next.

Physical layer 710 receives, via the antenna of AP 110, MAC frame 500/400, and forwards the frame to MAC layer 720. MAC layer 720 inspects fields 620 and 630 of the MAC header of frame 500/400 to determine if multiple IP packets are present in the payload of the MAC frame. If fields 620 and 630 indicate that the payload of the MAC frame contains multiple IP packets, MAC layer 720 strips the MAC header off frame 500/400, and forwards the aggregated payload portion of the MAC frame to de-aggregation layer 730. Alternatively, MAC layer 720 may rely on indication received during association (in an IE field of the association request frame) of STA 120 with AP 110, as well as the source address field (540 of FIG. 5) to determine whether the MAC frame 500/400 contains multiple IP packets or not. If MAC layer 720 determines that frame 500/400 is a 'normal' frame (i.e., does not contain multiple packets in its payload), MAC layer 720 forwards the payload directly to network layer 740.

De-aggregation layer 730 disassembles the aggregated payload containing multiple IP packets into individual IP packets, and forwards each of the individual IP packets to network layer 740.

For each of the individual IP packets received from de-aggregation layer 730, network layer 740 determines, based on the destination IP address in the corresponding IP packet and a routing table (not shown), the next-hop device (or specifically, the interface coupling to such next hop device) to which the IP packet is to be transmitted. Network layer 740 instructs MAC layer 720 to transmit each packet (and directly, i.e., without sending them to de-aggregation layer) to the determined next-hop device in case the packet is being transmitted on the wireless medium.

MAC layer 720 adds appropriate layer-2 headers to each of the IP packets received from network layer 740, and forwards each of the resulting layer-2 frames to physical layer 710. For example, if a received IP packet is destined for a STA in BSS 190, then MAC layer 720 adds an IEEE 802.11 header. On the other hand, if the next-hop device for a received IP packet is a device in internet 150, then MAC layer 720 adds an IEEE 802.3 header.

Physical layer 710 forwards each of the layer-2 frames along the path (coupled to the determined interface) to the destination.

As an example, when IP packets 420A through 420N are respectively destined for servers 140A through 140N, each of IP packets 420A through 420N would respectively be forwarded on the corresponding route (path 119) to servers 140A through 140N.

The description is continued with an illustration of the implementation details of a wireless device in an embodiment.

5. Wireless Device

Figure 8:
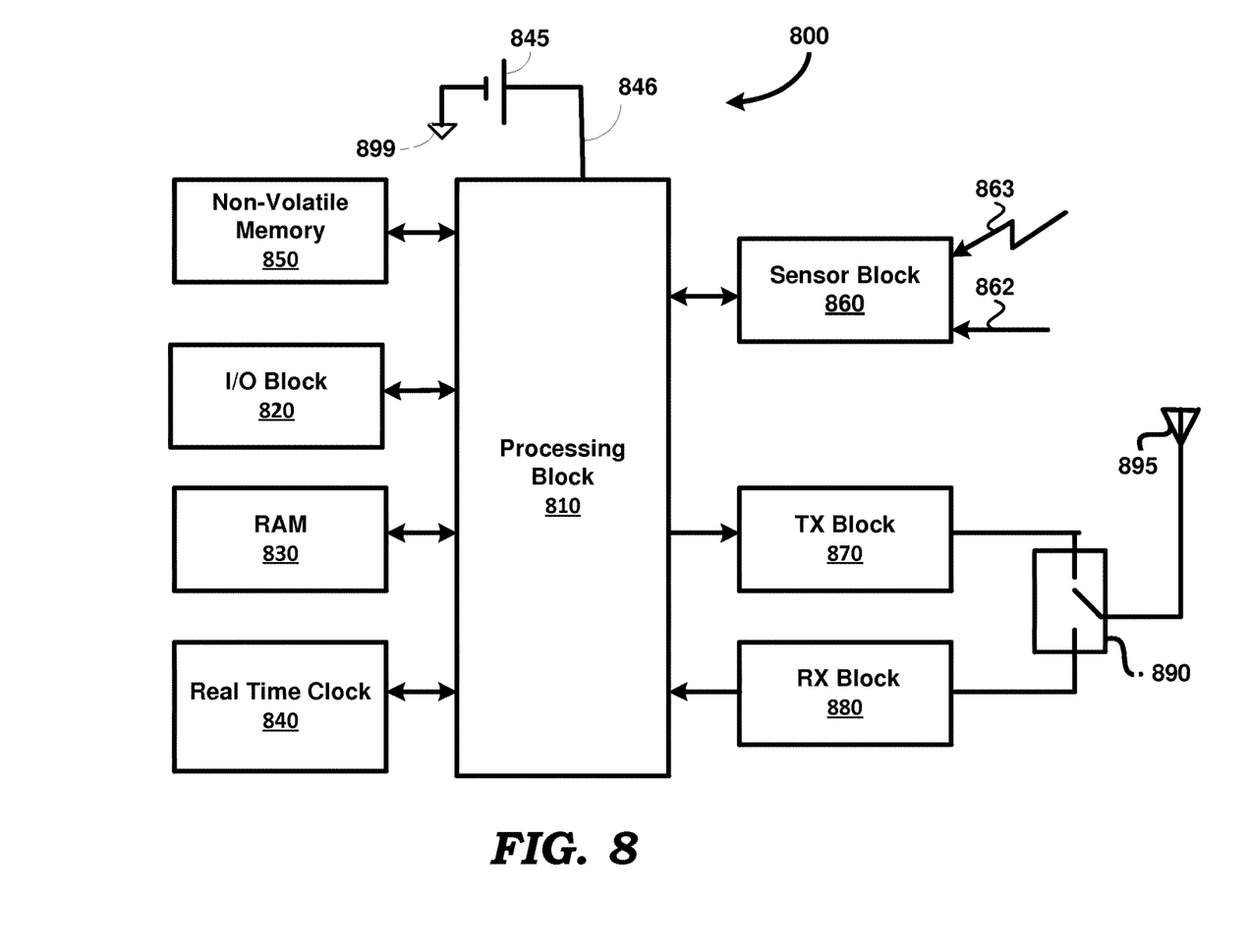
FIG. 8 is a block diagram illustrating the implementation details of a wireless device in an embodiment of the present disclosure.

FIG. 8 is a block diagram showing the implementation details of a wireless device in an embodiment of the present disclosure. STA 120 as well as AP 110 of FIG. 1 can be implemented as wireless device 800. Wireless Device 800 is shown containing processing block 810, input/output (I/O) block 820, random access memory (RAM) 830, real-time clock (RTC) 840, battery 845, non-volatile memory 850, sensor block 860, transmit (TX) block 870, receive (RX) block 880, switch 890, and antenna 895. The whole of wireless device 800 may be implemented as a system-on-chip (SoC), except for battery 845 and antenna 895. Alternatively, the blocks of FIG. 8 may be implemented on separate integrated circuits (IC). Terminals 846 and 899 respectively represent a power and a ground terminal.

Battery 845 provides power for operation of wireless device 800, and may be connected to the various blocks shown in FIG. 8. While wireless device 800 is shown as being battery-powered, in another embodiment, wireless device 800 is mains-powered and contains corresponding components such as transformers, regulators, power filters, etc. RTC 840 operates as a clock, and provides the 'current' time to processing block 810.

I/O block 820 provides interfaces for user interaction with wireless device 800, and includes input devices and output devices. Sensor block 860 may contain one or more sensors (e.g., sensors 160A-160M of FIG. 1), as well as corresponding signal conditioning circuitry, and provides to processing block 810, measurements/values of physical quantities such as temperature, pressure, etc., sensed via wired path 862 or wireless path 863. Sensor block 860 may perform analog-to-digital conversion of the measurement/values prior to forwarding the measurements/values to processing block 810. When AP 110 is implemented as wireless device 800, sensor block 860 may not be included.

Antenna 895 (corresponds to the antennas of AP 110 or STA 120) operates to receive from, and transmit to, a wireless medium, corresponding wireless signals (e.g., according to IEEE 802.11 (WLAN) standards). Switch 890 may be controlled by processing block 810 (connection not shown) to connect antenna 895 to one of blocks 870 and 880 as desired, depending on whether transmission or reception of wireless signals is required. Switch 890, antenna 895 and the corresponding connections of FIG. 8 are shown merely by way of illustration. Instead of a single antenna 895, separate antennas, one for transmission and another for reception of wireless signals, can also be used. Various other techniques, well known in the relevant arts, can also be used instead.

TX block 870 receives, from processing block 810, packets (such as those of the parallel data streams described above) to be transmitted on a wireless signal (e.g., according to a wireless standard such as IEEE 802.11), generates a modulated radio frequency (RF) signal (according to the standard), and transmits the RF signal via switch 890 and antenna 895. TX block 870 may contain RF and baseband circuitry for generating and transmitting wireless signals, as well as for medium access operations. Alternatively, TX block 870 may contain only the RF circuitry, with processing block 810 performing the baseband and medium access operations (in conjunction with the RF circuitry).

RX block 880 represents a receiver that receives a wireless (RF) signal (e.g., according to IEEE 802.11) bearing data and/or control information via switch 890, and antenna 895, demodulates the RF signal, and provides the extracted data or control information to processing block 810. RX block 880 may contain RF as well as baseband processing circuitry for processing a WLAN signal. Alternatively, RX block 880 may contain only the RF circuitry, with processing block 810 performing the baseband operations in conjunction with the RF circuitry.

Non-volatile memory 850 is a non-transitory machine readable medium, and stores instructions, which when executed by processing block 810, causes wireless device 800 to operate as STA 120 when STA 120 is implemented as wireless device 800, and as AP 110 when AP 110 is implemented as wireless device 800. In particular, the instructions enable STA 120 and AP 110 to operate respectively as described with respect to the flowcharts of FIGS. 2A and 2B.

RAM 830 is a volatile random access memory, and may be used for storing instructions and data. RAM 830 and non-volatile memory 850 (which may be implemented in the form of read-only memory/ROM/Flash) constitute computer program products or machine (or computer) readable medium, which are means for providing instructions to processing block 810. Processing block 810 may retrieve the instructions, and execute the instructions to provide several features of the present disclosure.

Processing block 810 (or processor in general) may contain multiple processing units internally, with each processing unit potentially being designed for a specific task. Alternatively, processing block 810 may contain only a single general-purpose processing unit. Processing block 810 may execute instructions stored in non-volatile memory 850 or RAM 830 to enable wireless device 800 to operate according to several aspects of the present disclosure (as corresponding to wireless station or AP), described above in detail.

6. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method performed in a wireless station of a wireless network, said method comprising:
   generating a sequence of messages comprising a first layer-2 frame comprising a field for said wireless station to indicate that a plurality of layer-3 packets would be contained in subsequent layer-2 frames and a subsequent single layer-2 frame containing multiple layer-3 packets in a payload of said single subsequent layer-2 frame, wherein each of said multiple layer-3 packets is destined to a different destination; and
   transmitting said single layer-2 frame to an access point (AP) of said wireless network.

2. The method of claim 1, wherein said wireless network is according to IEEE 802.11 standards, each layer-3 packet is an IP packet and said single layer-2 frame is a medium access control (MAC) frame.

3. The method of claim 1, wherein each of said layer-3 packets contains a layer-3 destination address of the corresponding destination.

4. The method of claim 1, wherein said generating generates a sequence of layer-3 packets at respective times instances of a sequence of time instances, and includes only some of said sequence of layer-3 packets as said plurality of layer-3 packets without violating a maximum transmission unit (MTU) specified by said wireless network.

5. The method of claim 4, wherein said generating includes only those of said sequence of layer-3 packets which are formed before expiration of a timer.

6. The method of claim 1, wherein said AP upon receiving said layer-2 frame comprising said header, disassembles said payload into individual layer-3 packets, and transmits each layer-3 packet towards a corresponding destination.

7. The method of claim 6, wherein said wireless station associates with said AP to join said wireless network by exchanging a sequence of messages, wherein a first message of said sequence of messages sent by said wireless station to said AP contains a field for said wireless station to indicate that multiple layer-3 packets would be contained in subsequent layer-2 frames, wherein said disassembling and transmitting of each layer-3 packet are performed by said AP in response to said first message.

8. The method of claim 6, wherein said disassembling and transmitting of each layer-3 packet are performed by said AP in response to said header indicating that said payload contains multiple layer-3 packets.

9. A wireless station of a wireless network, said wireless station comprising:

a processing block, a memory, and a transmitter circuit, said memory to store instructions which when retrieved and executed by said processing block causes said wireless station to:

generate a sequence of messages comprising a first layer-2 frame comprising a field for said wireless station to indicate that a plurality of layer-3 packets would be contained in subsequent layer-2 frames and a subsequent single layer-2 frame containing multiple layer-3 packets in a payload of said subsequent single layer-2 frame, wherein each of said multiple layer-3 packets is destined to a different destination;

transmit said sequence of messages to an access point (AP) of said wireless network.

10. The wireless station of claim 9, wherein said wireless station is configured to transmit over said wireless network according to IEEE 802.11 standards, each layer-3 packet is an IP packet and said layer-2 frames are medium access control (MAC) frames.

11. A system comprising the wireless station and AP of claim 9, wherein said AP is configured to disassemble and transmit each layer-3 packet in response to receiving said first layer-2 frame.

12. The system of claim 11, wherein said layer-2 frame comprises a header and a payload, said header indicating that said payload contains multiple layer-3 packets, wherein said AP is configured to disassemble and transmit each layer-3 packet in response to said header indicating that said payload contains multiple layer-3 packets.

13. The system of claim 12, wherein said payload consists of the plurality of layer-3 packets.

* * * * *